(12) United States Patent
Suzuki

(10) Patent No.: US 10,690,206 B2
(45) Date of Patent: Jun. 23, 2020

(54) BRAKE DEVICE

(71) Applicant: KYB Corporation, Tokyo (JP)

(72) Inventor: Tsutomu Suzuki, Kanagawa (JP)

(73) Assignee: KYB Corporation, Tokyo (JP)

( * ) Notice: Subject to any disclaimer, the term of this patent is extended or adjusted under 35 U.S.C. 154(b) by 85 days.

(21) Appl. No.: 15/763,051

(22) PCT Filed: Sep. 16, 2016

(86) PCT No.: PCT/JP2016/077577
§ 371 (c)(1),
(2) Date: Mar. 23, 2018

(87) PCT Pub. No.: WO2017/051785
PCT Pub. Date: Mar. 30, 2017

(65) Prior Publication Data
US 2018/0274612 A1    Sep. 27, 2018

(30) Foreign Application Priority Data

Sep. 25, 2015  (JP) ................................ 2015-187707

(51) Int. Cl.
*F16D 65/56* (2006.01)
*F16D 55/2255* (2006.01)
(Continued)

(52) U.S. Cl.
CPC ............. *F16D 65/567* (2013.01); *B61H 5/00* (2013.01); *F16D 41/064* (2013.01);
(Continued)

(58) Field of Classification Search
CPC .. F16D 65/567; F16D 55/2255; F16D 41/064; F16D 55/2245; F16D 65/18; F16D 65/56; B61H 5/00
(Continued)

(56) References Cited

U.S. PATENT DOCUMENTS 5,253,736 A * 10/1993 Kohler ................. B60T 17/081
                                                                188/170
9,371,078 B2 * 6/2016 Tsurusaki ................. B61H 5/00
(Continued)

FOREIGN PATENT DOCUMENTS

DE         19816211 C1    7/1999
DE      102011009540 A1    8/2011
(Continued)

OTHER PUBLICATIONS

International Search Report and Written Opinion in PCT/JP2016/077577, dated Nov. 15, 2016, 10pp.

*Primary Examiner* — Pamela Rodriguez
(74) *Attorney, Agent, or Firm* — Hauptman Ham, LLP

(57) ABSTRACT

A brake device includes: an extendable and contractable coupling member that couples one end portions of a pair of link arms to each other; and an adjuster that causes the coupling member to extend so that positions of brake linings relative to brake discs are adjusted to be constant. The adjuster includes: an extension mechanism that has an extension shaft with a male thread and an extension nut with a female thread, which is threadedly engaged with the male thread, and causes the coupling member to extend; and a pressing spring that presses the extension nut in an axial direction toward a contact surface, which is provided in a main body recess portion housing the extension nut and is in contact with one end portion of the extension nut.

6 Claims, 6 Drawing Sheets

(51) Int. Cl.
*F16D 65/18* (2006.01)
*B61H 5/00* (2006.01)
*F16D 41/064* (2006.01)
*F16D 55/224* (2006.01)

(52) U.S. Cl.
CPC ..... *F16D 55/2245* (2013.01); *F16D 55/2255* (2013.01); *F16D 65/18* (2013.01); *F16D 65/56* (2013.01)

(58) Field of Classification Search
USPC ....... 188/196 V, 72.9, 71.1, 72.8, 72.6, 72.1, 188/71.7, 71.8, 79.55, 153 R, 196 R, 197
See application file for complete search history.

(56) References Cited

U.S. PATENT DOCUMENTS

| | | | |
|---|---|---|---|
| 9,815,484 B2* | 11/2017 | Suzuki | B61H 5/00 |
| 10,161,466 B2* | 12/2018 | Suzuki | B61H 5/00 |
| 10,260,578 B2* | 4/2019 | Suzuki | B61H 5/00 |
| 2004/0074709 A1* | 4/2004 | Krug | B60T 13/743 188/72.1 |
| 2006/0219486 A1* | 10/2006 | Wagner | B61H 15/0028 188/1.11 L |
| 2012/0305343 A1 | 12/2012 | Ebner et al. | |
| 2015/0021126 A1 | 1/2015 | Tsurusaki et al. | |
| 2016/0137213 A1* | 5/2016 | Kimura | F16D 55/2255 188/71.9 |

FOREIGN PATENT DOCUMENTS

| | | |
|---|---|---|
| EP | 0699846 A2 | 3/1996 |
| JP | 2008-151168 A | 7/2008 |
| JP | 2008-151169 A | 7/2008 |
| JP | 2010-281458 A | 12/2010 |
| JP | 2013-123990 A | 6/2013 |

* cited by examiner

BRAKE DEVICE

RELATED APPLICATIONS

The present application is a National Phase of PCT/JP2016/077577, filed Sep. 16, 2016, and claims priority based on Japanese Patent Application No. 2015-187707, filed Sep. 25, 2015.

TECHNICAL FIELD

The present invention relates to a brake device.

BACKGROUND ART

JP 2010-281458A discloses a disc brake device for pinching and pressing a disc using brake pads that are respectively attached to two caliper levers. The disc brake device disclosed in JP 2010-281458A includes a gap adjustment mechanism for adjusting a gap that accompanies abrasion of the brake pads. The gap adjustment mechanism utilizes a screw mechanism.

SUMMARY OF INVENTION

In general, cars and railway vehicles are subjected to vibration while running. Thus, shock induced by vibration while cars and railway vehicles are running acts on a brake device. For this reason, in a brake device that includes an adjuster (a gap adjustment mechanism) utilizing a screw mechanism, there is a possibility that the screw mechanism rotates due to vibration-induced shock, resulting in an involuntary change in the distance between end portions of a pair of link arms.

In order to prevent such vibration-induced rotation of a screw mechanism, a detent mechanism may be installed in a brake device. However, the space around a pair of link arms in a brake device is small. Therefore, if a detent mechanism has a complicated structure, it is difficult to install the detent mechanism and adjust a detent force thereof.

The present invention aims to prevent involuntary operation of an adjuster in a brake device with use of a simple structure.

According to one aspect of the present invention, a brake device for braking a wheel by pinching brake discs rotatable together with the wheel includes a brake main body supported by a vehicle body or a truck; a pair of link arms having support portions between one end portions and other end portions thereof, the support portions being pivotably supported by the brake main body; an actuator actuated by supply and discharge of a working fluid, the actuator being configured to press brake linings against the brake discs by causing the pair of link arms to pivot, the brake linings being supported by the other end portions of the pair of link arms so as to face opposite surfaces of the brake discs, the brake linings being capable of imparting frictional forces by coming into sliding contact with the brake discs; a coupling member coupling the one end portions of the pair of link arms to each other, the coupling member being extendable and contractable; and an adjuster configured to cause the coupling member to extend so that positions of the brake linings relative to the brake discs are adjusted to be constant. The adjuster includes: an extension mechanism having a non-rotatable first member and a rotatable second member, the extension mechanism being configured to cause the coupling member to extend along with rotation of the second member relative to the first member, the first member being provided with a first screw portion, the second member being provided with a second screw portion threadedly engaged with the first screw portion; a torque transmission portion mounted on an outer circumference of the second member, the torque transmission portion being capable of transmitting a rotation torque to the second member only in the extending direction of the coupling member; a contact portion provided in a housing portion formed in the coupling member so as to house the second member, the contact portion being in contact with one end portion of the second member; and a pressing member configured to press the second member in an axial direction toward the contact portion.

DESCRIPTION OF EMBODIMENTS

The following describes an embodiment of the present invention with reference to the attached drawings.

First, a configuration of a brake device 100 according to the present embodiment will be described with reference to FIGS. 1 and 2.

The brake device 100 is mainly used in a railway vehicle. The brake device 100 brakes a wheel 1 by pinching brake discs 1a that rotate together with the wheel 1. Specifically, the brake device 100 pinches the brake discs 1a from opposite surfaces of the brake discs 1a with use of a pair of brake linings 2 so as to brake the rotation of the wheel 1 using frictional forces between the brake discs 1a and the brake linings 2.

The brake discs 1a are formed on opposite surfaces, that is to say, the front and back surfaces of the wheel 1, and rotate integrally with the wheel 1. Instead of being formed integrally with the wheel 1, the brake discs 1a may be provided as separate members that rotate together with the wheel 1.

Figure 1:
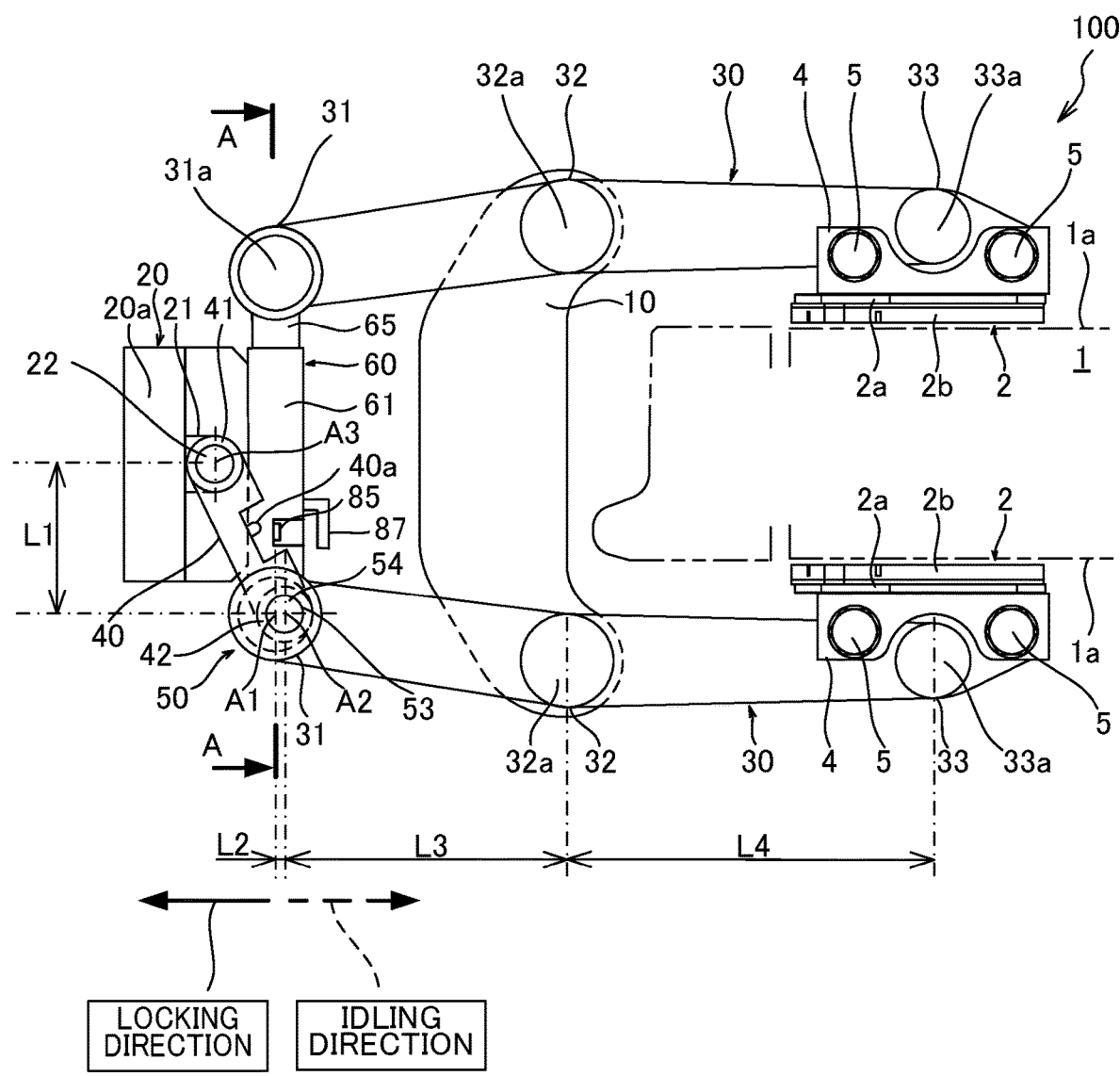
FIG. 1 is a plan view of a brake device according to an embodiment of the present invention.

When braking is not applied, the brake linings 2 oppose the brake discs 1a via a predetermined interval that has been set in advance (the state shown in FIG. 1). When braking is applied, the brake linings 2 move toward the brake discs 1a, come into contact with the brake discs 1a while being parallel to the brake discs 1a, and press the brake discs 1a.

The brake linings 2 include back plate portions 2a supported by lining holder portions 3 (see FIG. 2) of the brake device 100, and friction members 2b that come into contact with the brake discs 1a when braking is applied. The friction members 2b are composed of a plurality of segments and fixed to the surfaces of the back plate portions 2a. The brake linings 2 brake the rotation of the wheel 1 using frictional forces generated by contact between the friction members 2b and the brake discs 1a.

The lining holder portions 3 have dovetail grooves (not shown) into which the back plate portions 2a of the brake linings 2 are inserted. As shown in FIG. 2, anchor blocks 4 are respectively mounted on upper and lower end portions of each lining holder portion 3. The anchor blocks 4 are fixed to the lining holder portions 3 by anchor bolt pairs 5. The anchor blocks 4 fix end portions of the back plate portions 2a of the brake linings 2 in a longitudinal direction (a vertical direction in FIG. 2). In this way, the brake linings 2 inserted into the dovetail grooves are held by the lining holder portions 3.

Figure 3:
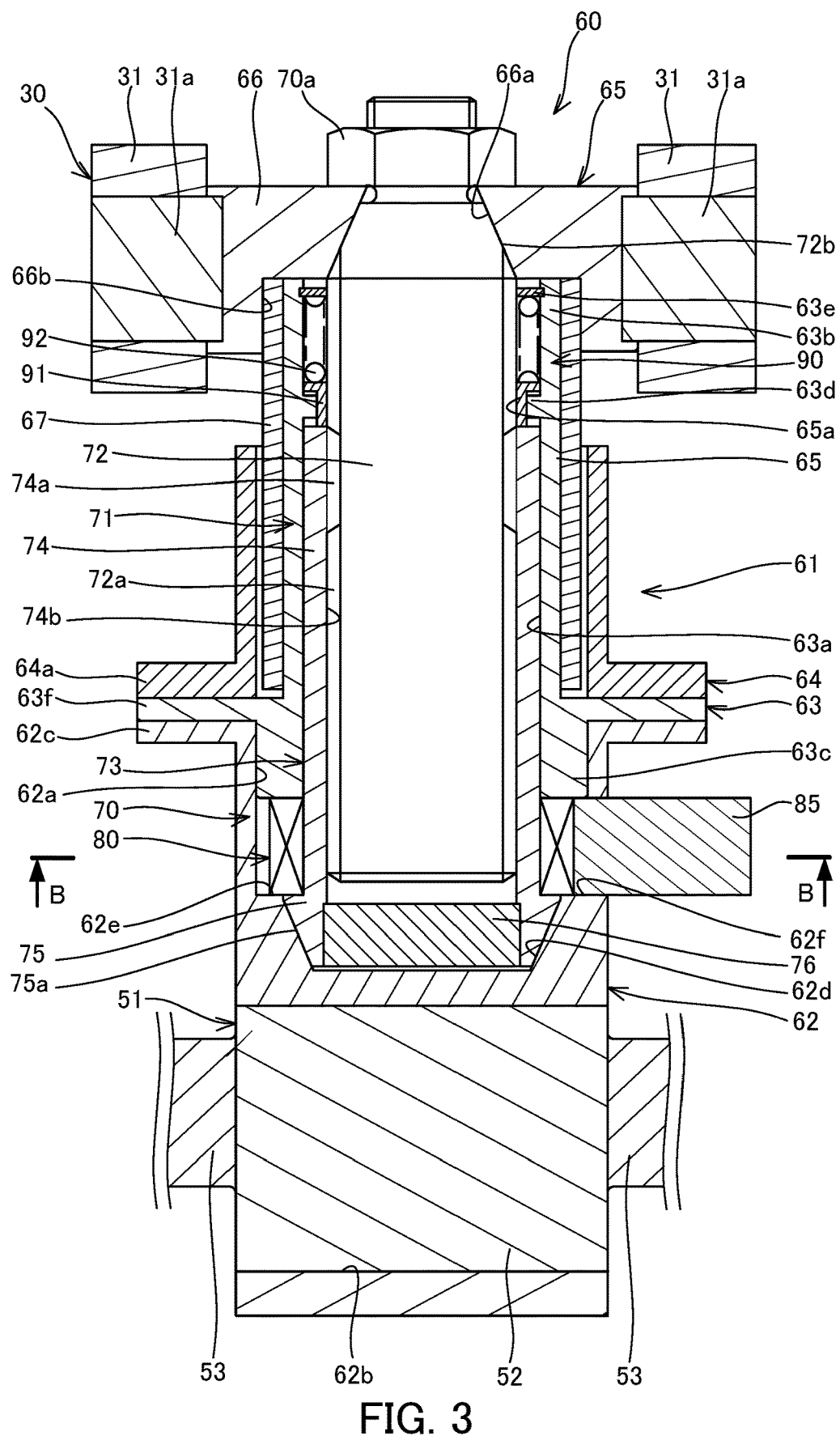
FIG. 3 is a cross-sectional view taken along the line A-A in FIG. 1.

As shown in FIG. 1, the brake device 100 includes a brake main body 10, a pair of link arms 30, an actuator 20, link levers 40, a servo unit 50, a coupling member 60, and an adjuster 70 (see FIG. 3). The link arms 30 have support portions 32 between one end portions 31 and the other end portions 33 thereof, and the support portions 32 are pivotably supported by the brake main body 10. The actuator 20 causes the pair of link arms 30 to pivot by advancing and retracting a rod 21 serving as an output member through supply and discharge of compressed air serving as a working fluid, thereby pressing the brake linings 2 against the brake discs 1a. The link levers 40 are pivotably coupled to the rod 21 of the actuator 20, and pivot along with the advancement and retraction of the rod 21. The servo unit 50 is mounted on at least one of the one end portions 31 of the pair of link arms 30, and causes the link arms 30 to pivot about the support portions 32, which act as fulcrums, by boosting a force transmitted through the pivoting motion of the link levers 40. The coupling member 60 is extendable and contractable, and couples the one end portions 31 of the pair of link arms 30 to each other. The adjuster 70 causes the coupling member 60 to extend so that the positions of the brake linings 2 relative to the brake discs 1a are adjusted to be constant.

When the brake device 100 is used in a railway vehicle, the brake main body 10 is supported by a truck (not shown). When the brake device 100 is used in a vehicle other than a railway vehicle, the brake main body 10 is supported by a vehicle body (not shown).

The actuator 20 is actuated on the basis of a braking operation performed by a driver, and advances and retracts the rod 21 with respect to an actuator main body 20a attached to the coupling member 60. The actuator 20 may be a fluid pressure actuator that utilizes another type of fluid, such as working oil or similar liquid, as working fluid instead of compressed air.

The actuator 20 is provided so as to be located on an opposite side to the support portions 32 in a state where the one end portions 31 of the link arms 30 are located therebetween. That is to say, the actuator 20 is provided so as to be opposed to the brake main body 10 in a state where the coupling member 60 is located therebetween. As the actuator 20 is thus located outside an area enclosed by the coupling member 60 and the pair of link arms 30, a degree of freedom in designing the link arms 30 is improved. Therefore, the link arms 30 can be shortened, and the brake device 100 can be reduced in size and weight.

Figure 2:
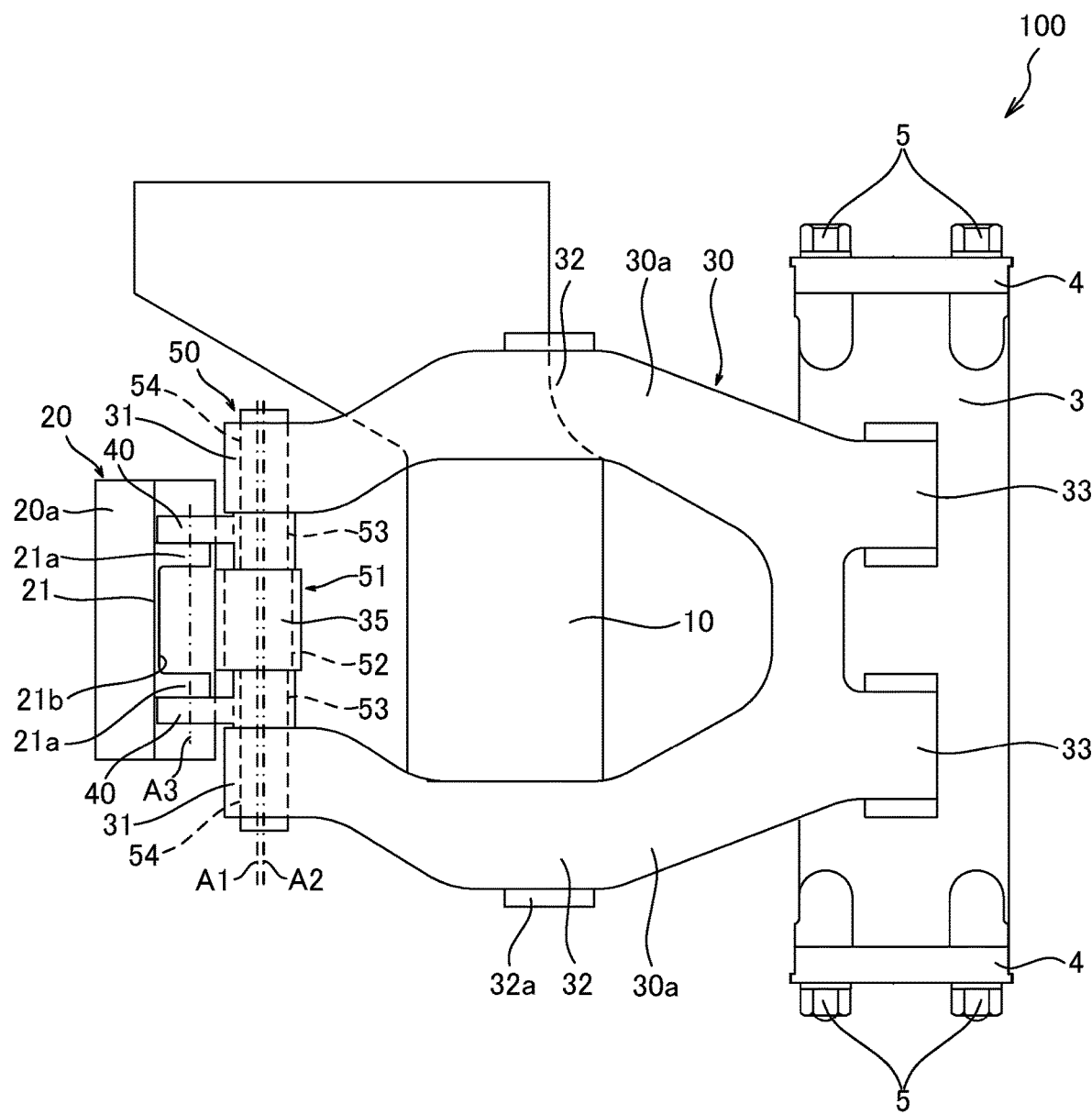
FIG. 2 is a front view of the brake device according to the embodiment of the present invention.

As shown in FIG. 2, the rod 21 is U-shaped and includes coupling portions 21a and a recess portion 21b. The coupling portions 21a are respectively coupled to the pair of link levers 40. The recess portion 21b is formed between the pair of coupling portions 21a. The recess portion 21b prevents interference between the rod 21 and the coupling member 60 when the rod 21 is retracted from the actuator main body 20a. Therefore, when the rod 21 is retracted from the actuator main body 20a, the coupling member 60 enters the recess portion 21b, and the pair of coupling portions 21a extends while avoiding the coupling member 60.

The rod 21 also includes a pair of rod shafts 22 (see FIG. 1) that enables the link levers 40 to be pivotably coupled respectively to the coupling portions 21a. The pair of rod shafts 22 is coaxially provided. The rod shafts 22 are arranged in such a manner that their central axis is parallel to the brake linings 2. The centers of the brake discs 1a are located on an extension of a central axis of the reciprocal motion of the rod 21. The rod 21 is advanced and retracted with respect to the actuator main body 20a, and swingable in a movable direction of the brake linings 2 (a vertical direction in FIG. 1).

As shown in FIG. 1, the link arms 30 respectively face opposite surfaces of the brake discs 1a. The one end portions 31 of the pair of link arms 30 are coupled to each other by the coupling member 60. The brake linings 2, which impart frictional forces by coming into sliding contact with the brake discs 1a, are swingably supported by the other end portions 33 of the link arms 30. As shown in FIG. 2, each link arm 30 is substantially U-shaped and includes a pair of upper and lower arm portions 30a.

As shown in FIG. 1, the one end portion 31 of one link arm 30 is provided with a coupling shaft 31a that penetrates and couples together the coupling member 60 and this link arm 30. The one end portion 31 of the other link arm 30 is provided with the servo unit 50 that penetrates and couples together the coupling member 60, this link arm 30, and the pair of link levers 40. The servo unit 50 causes the link arms 30 to pivot by boosting a force generated by the advancement and retraction of the rod 21 of the actuator 20.

Alternatively, the one end portion 31 of one link arm 30 and the one end portion 31 of the other link arm 30 may both be provided with the servo unit 50. In this case, the servo units 50 can respectively cause one link arm 30 and the other link arm 30 to pivot. Alternatively, the coupling member 60 may be divided into a first coupling member coupled to one link arm 30 and a second coupling member coupled to the other link arm 30, and the servo unit 50 may be provided between the first and second coupling members. The servo unit 50 will be described later in detail.

The support portions 32 of the link arms 30 are provided with arm shafts 32a that penetrate and couple together the link arms 30 and the brake main body 10. The link arms 30 are pivotably supported by the brake main body 10 via the arm shafts 32a. When braking is applied by the brake device 100, circumferential tangential forces that act on the brake linings 2 from the brake discs 1a act on the brake main body 10 from the support portions 32 via the arm shafts 32a.

The other end portions 33 of the link arms 30 are provided with lining shafts 33a that penetrate and couple together the link arms 30 and the lining holder portions 3. The lining holder portions 3 are pivotably supported by the link arms 30 via the lining shafts 33a. Accordingly, the brake linings 2 are swingable with respect to the link arms 30, and can always come into contact with the brake discs 1a while being parallel to the brake discs 1a when braking is applied.

The link levers 40 transmit a force generated by the advancement and retraction of the rod 21 of the actuator 20 to the servo unit 50. One end portions 41 of the link levers 40 are pivotably coupled to the rod shaft 22 of the rod 21. The other end portions 42 of the link levers 40 are coupled to later-described eccentric portions 53 of the servo unit 50 in such a manner that the other end portions 42 cannot pivot.

Along with the advancement and retraction of the rod 21 with respect to the actuator main body 20a, the link levers 40 pivot between the rod shaft 22 and the eccentric portions 53. In the state where the rod 21 has been retracted from the actuator main body 20a to the maximum, the link levers 40 pivot to the point where they are parallel to the coupling member 60.

A pressing pin 40a is mounted on the link levers 40. The pressing pin 40a can press a later-described rotation lever 85 of the adjuster 70 along with the pivoting motion of the link levers when braking is applied. The pressing pin 40a is provided as a shaft member that has a semispherical tip. Note that the pressing pin 40a may be formed integrally with the link levers 40. Alternatively, the pressing pin 40a may be simply formed as a semispherical projection without including a shaft portion.

As shown in FIG. 2, the servo unit 50 includes an eccentric cam 51 that rotates about a rotation axis A1 along with the pivoting motion of the link levers 40. The rotation axis A1 of the eccentric cam 51 is located in such a manner that its position is equivalent to the position of a central axis of the coupling shaft 31a relative to the link arms 30.

The eccentric cam 51 includes a rotation portion 52, the eccentric portions 53, and a pair of arm coupling portions 54. The rotation portion 52 is pivotably coupled to the coupling member 60. The eccentric portions 53 have a central axis A2 at a position offset from the rotation axis A1 of the eccentric cam 51, and pivot on an arc-shaped path about the rotation axis A1 along with the pivoting motion of the link levers 40. The pair of arm coupling portions 54 is coaxial with the eccentric portions 53 and rotatably supported by the corresponding link arm 30.

The rotation portion 52 has the same outer diameter as the coupling shaft 31a. A central axis of the rotation portion 52 is the rotation axis A1 of the eccentric cam 51.

The eccentric portions 53 have a smaller diameter than the rotation portion 52. The eccentric portions 53 are respectively mounted on opposite axial sides of the rotation portion 52. The link levers 40 are coupled to the eccentric portions 53 in such a manner that the link levers 40 cannot pivot relative to the eccentric portions 53. Therefore, when the link levers 40 pivot along with the advancement and retraction of the rod 21 with respect to the actuator main body 20a, the eccentric portions 53 pivot on an arc-shaped path about the rotation axis A1. As a result, the distance between the pair of link arms 30 is increased and reduced.

The arm coupling portions 54 have the same diameter as the eccentric portions 53. The arm coupling portions 54 is provided on an opposite side to the rotation portion 52 in a state where the eccentric portions 53 are located therebetween. Alternatively, the arm coupling portions 54 may have a smaller diameter than the eccentric portions 53. Alternatively, each arm coupling portion 54 may be provided between the corresponding eccentric portion 53 and the rotation portion 52.

As described above, the eccentric cam 51 has the rotation portion 52 at the center thereof, the eccentric portions 53 having a smaller diameter than the rotation portion 52 at opposite ends of the rotation portion 52, and the arm coupling portions 54 having the same diameter as or a smaller diameter than the eccentric portions 53 at opposite ends of the eccentric portions 53. Therefore, the eccentric cam 51 is gradually reduced in diameter from its center toward its opposite end portions. This allows for easy processing. Furthermore, as the coupling member 60, the link levers 40, and the link arms 30 can be attached to the eccentric cam 51 in order, assembly can be facilitated.

Figure 4:
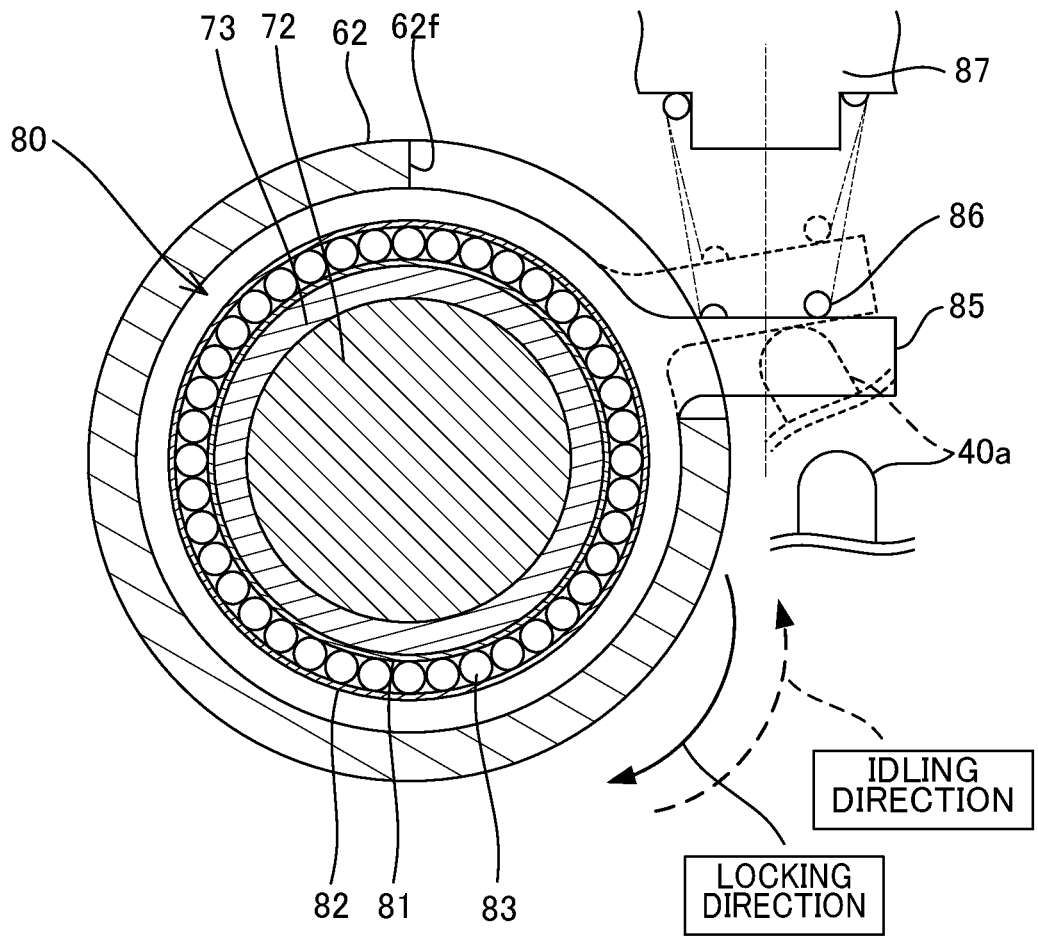
FIG. 4 is a cross-sectional view taken along the line B-B in FIG. 3.

A description is now given of the specifics of the configurations of the coupling member 60 and the adjuster 70 with reference to FIGS. 3 and 4.

As shown in FIG. 3, the coupling member 60 includes a coupling main body portion 61 whose one end is coupled to one link arm 30 via the eccentric cam 51, and a coupling rod portion 65 whose one end is coupled to the other link arm 30. The coupling member 60 extends and contracts in an axial direction as the coupling main body portion 61 and the coupling rod portion 65 move relative to each other in the axial direction.

The coupling member 60 is provided with a dust cover (not shown) that covers the other ends of the coupling main body portion 61 and the coupling rod portion 65 to prevent intrusion of dust. The actuator main body 20a of the actuator 20 is attached to the coupling main body portion 61 (see FIG. 1).

The coupling main body portion 61 includes a coupling base portion 62 into which the eccentric cam 51 is inserted, a guide sleeve 63 that is coupled to the coupling base portion 62 and inserted into the coupling rod portion 65, and a cover sleeve 64 that is coupled to the coupling base portion 62 and placed around an outer circumference of the guide sleeve 63.

The coupling base portion 62 has a main body recess portion 62a serving as a housing portion that opens at one end side of the coupling base portion 62, a cam hole 62b into which the rotation portion 52 of the eccentric cam 51 is rotatably inserted, and a first flange portion 62c that extends radially outward from one end portion of the coupling base portion 62 and is coupled to the guide sleeve 63 and the cover sleeve 64.

The main body recess portion 62a has a contact surface 62d serving as a contact portion, and a vertical surface 62e. The contact surface 62d extends from a bottom portion of the main body recess portion 62a, and is formed in a tapered shape in such a manner that it inclines with respect to a central axis of the main body recess portion 62a. The vertical surface 62e extends radially outward from an end portion of the contact surface 62d opposite to the bottom portion.

The guide sleeve 63 is a tubular member placed at an opening portion of the main body recess portion 62a. The guide sleeve 63 has a through hole 63a that extends axially, a distal end portion 63b that is inserted into the inner side of the coupling rod portion 65, a proximal end portion 63c that is inserted into the main body recess portion 62a, an annular step portion 63d that projects radially inward from an inner circumferential surface of the through hole 63a, an annular seat portion 63e, and a second flange portion 63f that is coupled to the first flange portion 62c of the coupling base portion 62. The seat portion 63e projects radially inward from the inner circumferential surface of the through hole 63a, and is closer to a distal end of the guide sleeve 63 (closer to the coupling rod portion 65) than the step portion 63d is. A later-described pressing spring 92 serving as a pressing member is seated on the seat portion 63e.

The cover sleeve 64 is a tubular member that is placed with a radial gap between itself and the guide sleeve 63. The cover sleeve 64 has a third flange portion 64a that is coupled to the first flange portion 62c of the coupling base portion 62. With the presence of the cover sleeve 64, the adjuster 70 can be protected from, for example, shock caused by flying objects and intrusion of dust in a more reliable manner.

The first, second, and third flange portions 62c, 63f, 64a are coupled to one another by fastening bolts (not shown) that are inserted therethrough. Accordingly, the coupling base portion 62, the guide sleeve 63, and the cover sleeve 64 are integrated, and altogether consist the coupling main body portion 61 that moves relative to the coupling rod portion 65.

The coupling rod portion 65 has a rod base portion 66 that is coupled to the one end portion 31 of the other link arm 30, and a slide sleeve 67. The distal end portion 63b of the guide sleeve 63 of the coupling main body portion 61 is slidably inserted into the inner side of the slide sleeve 67.

The rod base portion 66 has an insertion hole 66a through which an extension shaft 72 of a later-described extension mechanism 71 is inserted, and a sleeve recess portion 66b into which one end of the slide sleeve 67 is inserted. The insertion hole 66a is formed in a tapered shape so as to increase in inner diameter toward the coupling main body portion 61, that is, toward a lower side of FIG. 3.

The slide sleeve 67 is coupled to the rod base portion 66 via the sleeve recess portion 66b. The other end portion of the slide sleeve 67 is housed in the radial gap between the guide sleeve 63 and the cover sleeve 64 of the coupling main body portion 61.

When the brake linings 2 have been abraded by the brake device 100 in a braking state, the adjuster 70 causes the coupling member 60 to extend in accordance with the amount of abrasion of the brake linings 2. As shown in FIG. 3, the coupling member 60 serves as a housing inside which the adjuster 70 is placed.

The adjuster 70 includes the extension mechanism 71, a one-way clutch 80, and a resistance imparting portion 90. The extension mechanism 71 causes the coupling member 60 to extend using a relatively-rotatable screw mechanism. The one-way clutch 80 serves as a torque transmission portion that can transmit a rotation torque to the extension mechanism 71 only in the extending direction of the coupling member 60. The resistance imparting portion 90 imparts resistance to the rotation of the screw mechanism of the extension mechanism 71.

The extension mechanism 71 includes the extension shaft 72 and an extension nut 73. The extension shaft 72 serves as a first member provided with a male thread 72a serving as a first screw portion. The extension nut 73 serves as a second member provided with a female thread 74a serving as a second screw portion that is threadedly engaged with the male thread 72a of the extension shaft 72. The extension shaft 72 and the extension nut 73 constitute the screw mechanism.

The extension shaft 72 is a bolt member that is placed at the inner side of the guide sleeve 63 of the coupling member 60 and the slide sleeve 67 of the coupling rod portion 65, and extends along the lengths of the coupling main body portion 61 and the coupling rod portion 65. The extension shaft 72 is placed with a gap between itself and an inner circumference of the guide sleeve 63 of the coupling main body portion 61.

The extension shaft 72 is inserted through the insertion hole 66a of the rod base portion 66 of the coupling rod portion 65, and fixed to the rod base portion 66 by a nut 70a. That is to say, the extension shaft 72 is fixed to the coupling rod portion 65 of the coupling member 60, which serves as the housing, in such a manner that the extension shaft 72 cannot rotate. The other end of the extension shaft 72 is provided with the male thread 72a, and housed in the coupling main body portion 61.

The extension shaft 72 has an outer circumferential surface 72b that is formed in a tapered shape corresponding to an inner circumferential surface of the insertion hole 66a. The extension shaft 72 is inserted through the insertion hole 66a in a state where the outer circumferential surface 72b is in contact with the inner circumferential surface of the insertion hole 66a. Accordingly, an area of contact between the extension shaft 72 and the insertion hole 66a increases, and a frictional force therebetween increases. This prevents relative rotation when the nut 70a is fastened to the extension shaft 72.

The extension nut 73 is a nut member that is threadedly engaged with the extension shaft 72. The extension nut 73 includes a main body portion 74 provided with the female thread 74a that is threadedly engaged with the male thread 72a of the extension shaft 72, and a pressing end portion 75 that is located at one end portion of the extension nut 73 and placed inside the main body recess portion 62a of the coupling base portion 62. The extension nut 73 is configured to be rotatable relative to the extension shaft 72, with the pressing end portion 75 placed inside the main body recess portion 62a, and the main body portion 74 placed between the guide sleeve 63 and the extension shaft 72.

The main body portion 74 has a bolt insertion hole 74b through which the extension shaft 72 is inserted. A part of the bolt insertion hole 74b is formed as the female thread 74a.

The pressing end portion 75 has a pressing surface 75a that is formed in a tapered shape corresponding to the contact surface 62d of the main body recess portion 62a and that comes into contact with the contact surface 62d. The maximum outer diameter of the pressing end portion 75 is larger than the maximum outer diameter of the main body portion 74. Accordingly, an area of contact between the pressing surface 75a of the pressing end portion 75 and the contact surface 62d of the main body recess portion 62a can be increased.

A reinforcement portion 76 that reinforces the pressing end portion 75 is provided at the inner side of the pressing end portion 75 of the extension nut 73. The reinforcement portion 76 is a solid support member that is press-fitted in the extension nut 73 from one end portion and supports an inner circumference of the extension nut 73. When braking is applied by the brake device 100, a large braking force acts on the extension nut 73 and the extension shaft 72 via the coupling member 60 in the axial direction. The presence of the reinforcement portion 76 in the pressing end portion 75 of the extension nut 73 reliably provides strength to the pressing end portion 75, which has the tapered pressing surface 75a and a small wall thickness. Therefore, even if a large force acts when braking is applied, damage to the extension nut 73 can be prevented, and the durability of the extension nut 73 can be improved.

The one-way clutch 80 is provided inside the main body recess portion 62a of the coupling main body portion 61, and its position in the axial direction is defined by the vertical surface 62e of the main body recess portion 62a and the proximal end portion 63c of the guide sleeve 63. As shown in FIG. 4, the one-way clutch 80 includes an inner race 81, an outer race 82, and sprags 83. The inner race 81 is press-fitted on an outer circumference of the extension nut 73. The rotation lever 85 that projects radially outward and is exposed to the outside of the coupling member 60 is mounted on the outer race 82. The sprags 83 are disposed between the inner race 81 and the outer race 82.

In the one-way clutch 80, the sprags 83 lock the inner race 81 and the outer race 82 together when the inner race 81 and the outer race 82 relatively rotate in one direction, whereas the inner race 81 and the outer race 82 idle together when they relatively rotate in the other direction. The rotation lever 85 is exposed to the outside of the coupling base portion 62 of the coupling member 60 via a circumferential groove 62*f*. The circumferential groove 62*f* is formed in a part of the coupling base portion 62 in a circumferential direction, and penetrates the inner and outer circumferential surfaces of the coupling base portion 62.

The coupling main body portion 61 also includes a support wall portion 87 for supporting a lever spring 86 serving as a lever pushing member that pushes the rotation lever 85 (see FIGS. 1 and 4). The lever spring 86 is interposed in a compressed state between the support wall portion 87 and the rotation lever 85, and pushes the rotation lever 85 in a direction in which the inner race 81 and the outer race 82 of the one-way clutch 80 are locked together. The lever spring 86 is a tapered spring that decreases in winding diameter from the support wall portion 87 toward the rotation lever 85. When braking is not applied by the brake device 100, the lever spring 86 pushes the rotation lever 85 against one end of the circumferential groove 62*f*, thereby bringing the rotation lever 85 into contact with a wall portion of the circumferential groove 62*f*. Note that the lever spring 86 is not limited to the tapered spring, and may be a coil spring having a constant winding diameter.

When a rotation torque in one direction (a direction of a solid-line arrow in FIG. 4) acts on the outer race 82 of the one-way clutch 80 via the rotation lever 85, the inner race 81 and the outer race 82 of the one-way clutch 80 are locked together, and the one-way clutch 80 rotates in one direction together with the extension nut 73. In contrast, when a rotation torque in the other direction (a direction of a dash-line arrow in FIG. 4) acts on the outer race 82 of the one-way clutch 80, the inner race 81 and the outer race 82 of the one-way clutch 80 idle, and only the outer race 82 of the one-way clutch 80 rotates. Hereinafter, a rotation direction in which the outer race 82 is locked with the inner race 81 (the direction of the solid-line arrow in FIG. 4), that is to say, a direction in which the one-way clutch 80 and the extension nut 73 rotate together, is referred to as a "locking direction." In contrast, a rotation direction in which the outer race 82 idles relative to the inner race 81 (the direction of the dash-line arrow in FIG. 4) is referred to as an "idling direction."

As the one-way clutch 80 rotates in the locking direction together with the extension nut 73, the extension nut 73 rotates relative to the extension shaft 72. As a result, the extension nut 73 and the extension shaft 72 are separated from each other, and the extension mechanism 71 extends. Accordingly, the coupling main body portion 61 coupled to the extension nut 73 and the coupling rod portion 65 coupled to the extension shaft 72 are separated from each other, and the coupling member 60 extends. As such, the one-way clutch 80 transmits a rotation torque to the extension nut 73 only in the direction that causes the extension nut 73 and the extension shaft 72 to be separated from each other, that is to say, the extending direction of the extension mechanism 71.

The pressing pin 40*a* presses the rotation lever 85 along with the pivoting motion of the link levers 40 when braking is applied. This causes the one-way clutch 80 to rotate in the idling direction. In other words, the rotation lever 85 is pressed by the link levers 40 via the pressing pin 40*a* along with the pivoting motion of the link levers 40 when braking is applied. In FIG. 1, a direction of a solid-line arrow denotes the locking direction, whereas a direction of a dash-line arrow denotes the idling direction.

As shown in FIG. 3, the resistance imparting portion 90 is composed of a retainer 91, the contact surface 62*d*, and the pressing spring 92. The retainer 91 is provided at the inner side of the guide sleeve 63 and is in contact with the other end portion of the extension nut 73 in the axial direction. The contact surface 62*d* composes the main body recess portion 62*a*, which is provided in the coupling base portion 62 of the coupling member 60 and houses the extension nut 73, and is in contact with the pressing end portion 75 of the extension nut 73. The pressing spring 92 serves as the pressing member that is interposed in a compressed state between the seat portion 63*e* of the guide sleeve 63 and the retainer 91, and presses the extension nut 73 in the axial direction toward the contact surface 62*d* via the retainer 91.

In the axial direction, the retainer 91 is in contact with the other end portion of the extension nut 73, but is distanced from, that is, out of contact with the step portion 63*d* of the guide sleeve 63. Accordingly, a pushing force of the pressing spring 92 is transmitted to the extension nut 73 via the retainer 91 without getting obstructed by the step portion 63*d*.

The pressing spring 92 is a coil spring that presses the extension nut 73 toward the contact surface 62*d* via the retainer 91. Due to the pressing spring 92, the pressing surface 75*a* of the extension nut 73 is pushed against the contact surface 62*d*, and a frictional force between the pressing surface 75*a* and the contact surface 62*d* increases. Therefore, when the extension nut 73 rotates, the pressing surface 75*a* and the contact surface 62*d* come into sliding contact with each other, thereby imparting the frictional force as resistance to the rotation of the extension nut 73. As the pressing spring 92 thus imparts the frictional force to the rotation of the extension nut 73, involuntary rotation of the extension nut 73 relative to the extension shaft 72 caused by, for example, vibration of the vehicle is prevented.

The pressing surface 75*a* and the contact surface 62*d* are in contact with each other as they are formed in a tapered shape corresponding to each other. Therefore, compared with a case in which they are formed as flat surfaces perpendicular to the central axis, an area of contact therebetween increases, and the frictional force further increases due to the wedge effect. Such tapered shapes of the pressing surface 75*a* and the contact surface 62*d* can prevent involuntary rotation of the extension nut 73 relative to the extension shaft 72 in a more effective manner.

As the pressing spring 92 is seated on the seat portion 63*e* of the guide sleeve 63, the pressing spring 92 does not change in length and its pushing force can be kept constant even when the coupling member 60 extends. Note that when the pushing force is permitted to change along with the extension of the coupling member 60, the pressing spring 92 may be seated on the coupling rod portion 65. The pressing spring 92 is not limited to a member that pushes the extension nut 73 against the contact surface 62*d* via the retainer 91, and may directly push the extension nut 73 against the contact surface 62*d*.

A description is now given of the functions of the brake device 100 with reference to FIGS. 1 and 2.

Once the actuator 20 has been actuated on the basis of a braking operation performed by a driver, the brake device 100 switches from a non-braking state (the state shown in FIGS. 1 and 2) to a braking state.

Once the rod 21 has been retracted from the actuator main body 20*a* along with the actuation of the actuator 20, the link levers 40 are pushed by the rod shafts 22 and pivot. The force imparted by the actuator 20 to retract the rod 21 is transmitted to the eccentric portions 53 of the eccentric cam 51 via the link levers 40.

The eccentric cam 51 rotates in one direction (in FIG. 1, a clockwise direction) as the eccentric portions 53 pivot on an arc-shaped path about the rotation axis A1 due to the force transmitted via the link levers 40. As a result, the arm coupling portions 54 pivot integrally with the eccentric portions 53 in a direction away from the rod 21, and thus the one end portions 31 of the pair of link arms 30 move away from each other.

The link arms 30 are pivotably supported by the brake main body 10 via the support portions 32. Thus, as the one end portions 31 move away from each other, the other end portions 33 move toward each other. As a result, the brake linings 2 move toward, come into contact with, and are pressed against the brake discs 1*a* while being parallel to the brake discs 1*a*, thereby braking the rotation of the wheel 1.

At this time, the eccentric cam 51 boosts a force transmitted from the rod 21 via the link levers 40 by a factor of L1/L2, and transmits the boosted force to the link arms 30. This boosting is performed on the basis of a lever ratio between a distance L1 from the central axis A3 of the rod shafts 22 to the rotation axis A1 and a distance L2 from the rotation axis A1 and the central axis A2 of the eccentric portions 53. In this way, a large braking force can be obtained without providing a large actuator. Therefore, the brake device 100 can be reduced in size and weight.

The force transmitted from the eccentric cam 51 to the one end portions 31 of the link arms 30 is boosted by a factor of L3/L4. This boosting is performed on the basis of a lever ratio between a distance L3 from the one end portions 31 to the support portions 32 and a distance L4 from the support portions 32 to the other end portions 33. In the brake device 100, as the distance L4 is larger than the distance L3, forces that press the brake linings 2 against the brake discs 1*a* are smaller than a force transmitted from the eccentric cam 51 to the one end portions 31 of the link arms 30.

However, in the brake device 100, the eccentric cam 51 boosts a force transmitted from the rod 21 of the actuator 20 via the link levers 40 by a large factor. Therefore, a sufficiently large braking force can be obtained even if the link arms 30 are shortened to reduce the distance L3 for the purpose of reducing the size and weight of the brake device 100.

When the actuator 20 is actuated in a direction opposite to a braking direction on the basis of a braking releasing operation performed by a driver, the brake device 100 switches from the braking state to the non-braking state (the states shown in FIGS. 1 and 2).

Once the rod 21 has been advanced into the actuator main body 20*a* along with the actuation of the actuator 20, the link levers 40 are pulled by the rod shafts 22 and pivot. The force imparted by the actuator 20 to retract the rod 21 is transmitted to the eccentric portions 53 of the eccentric cam 51 via the link levers 40.

The eccentric cam 51 rotates in the other direction (in FIG. 1, a counterclockwise direction) as the eccentric portions 53 pivot on an arc-shaped path about the rotation axis A1 due to the force transmitted via the link levers 40. As a result, the one end portions 31 of the pair of link arms 30 move toward each other. Accordingly, the other end portions 33 of the pair of link arms 30 move away from each other. This causes the brake linings 2 to be separated from the brake discs 1*a*, thereby releasing braking of the wheel 1.

A description is now given of the functions of the adjuster 70 with reference to FIG. 4.

When the amount of abrasion of the brake linings 2 is small, the amount of movement of the brake linings 2 toward the brake discs 1*a* is small. Therefore, even if the brake device 100 has entered the braking state along with the actuation of the actuator 20, the pressing pin 40*a* mounted on the link levers 40 does not come into contact with and press the rotation lever 85 of the adjuster 70, as indicated by solid lines in FIG. 4.

As the abrasion of the brake linings 2 progresses, the amount of movement of the brake linings 2 toward the brake discs 1*a* increases. In this case, when the brake device 100 is in the braking state, the link levers 40 press the rotation lever 85 via the pressing pin 40*a* against a pushing force of the lever spring 86 along with the pivoting motion of the link levers 40, as indicated by dash lines in FIG. 4. As the pressing pin 40*a* presses the rotation lever 85, the one-way clutch 80 rotates in the idling direction.

In this situation, if the braking state is released, the link levers 40 pivot, and the pressing pin 40*a* moves back. Accordingly, the rotation lever 85 moves in the locking direction due to the pushing force of the lever spring 86, and a rotation torque in the locking direction acts on the outer race 82 of the one-way clutch 80. The one-way clutch 80 transmits the rotation torque in the locking direction to the extension nut 73. Therefore, the extension nut 73 rotates. As a result, the extension nut 73 and the extension shaft 72 are separated from each other, and the extension mechanism 71 extends.

As the extension mechanism 71 extends, the coupling member 60 extends, and the one end portions 31 of the pair of link arms 30 move away from each other. In other words, as the coupling member 60 extends, the distance between the eccentric cam 51 coupled to the coupling base portion 62 of the coupling main body portion 61 and the coupling shaft 31*a* coupled to the coupling rod portion 65 increases.

As the one end portions 31 of the pair of link arms 30 move away from each other, the pair of link arms 30 pivots about the support portions 32, which act as fulcrums, and the other end portions 33 move toward each other. As described above, as the distance between the one end portions 31 of the pair of link arms 30 is increased by the extension of the coupling member 60, the positions of the brake linings 2 can be brought close to the brake discs 1*a* by the thickness corresponding to the abrasion when braking is not applied. Therefore, even if the brake linings 2 have been abraded, the intervals between the brake linings 2 and the brake discs 1*a* can always be kept constant when braking is not applied.

The actuator main body 20*a* and the servo unit 50 are attached to the coupling main body portion 61 of the coupling member 60. The coupling member 60 extends as the coupling main body portion 61 and the coupling rod portion 65 move relative to each other. Therefore, the extension of the coupling member 60 caused by the abrasion of the brake linings 2 does not change the positional relationship between the actuator 20 and the servo unit 50. This can prevent a change in the actuation properties of the actuator 20 regardless of the abrasion of the brake linings 2.

When braking is not applied, due to vibration of the vehicle and the like, an involuntary force that rotates the extension nut 73 relative to the extension shaft 72 may act on the extension nut 73. Even in this case, as the pushing force of the pressing spring 92 pushes the pressing surface 75*a* of the extension nut 73 against the contact surface 62*d* of the main body recess portion 62*a*, the frictional force between the pressing surface 75*a* and the contact surface 62*d* (hereinafter referred to as a "detent force") prevents involuntary rotation. That is, as the extension nut 73 is pinched in the axial direction by the pressing spring 92 and the contact surface 62d of the coupling member 60 that serves as the housing for the adjuster 70, involuntary rotation of the extension nut 73 relative to the extension shaft 72 is prevented.

The detent force is determined by the pushing force of the pressing spring 92 and by the area of contact between the pressing surface 75a and the contact surface 62d. Therefore, the detent force can be adjusted by adjusting the pushing force of the pressing spring 92 as well as the area of contact between the pressing surface 75a and the contact surface 62d, specifically, a taper angle.

The magnitude of the detent force is set such that the detent force does not restrict the rotation of the extension nut 73 relative to the extension shaft 72, that is, the rotation that causes the coupling member 60 to extend for the purpose of gap adjustment. In this way, involuntary rotation of the extension nut 73 relative to the extension shaft 72 caused by, for example, vibration of the vehicle can be prevented while making adjustment to keep the positions of the brake linings 2 relative to the brake discs 1a constant by causing the coupling member 60 to extend using the adjuster 70.

Figure 5:
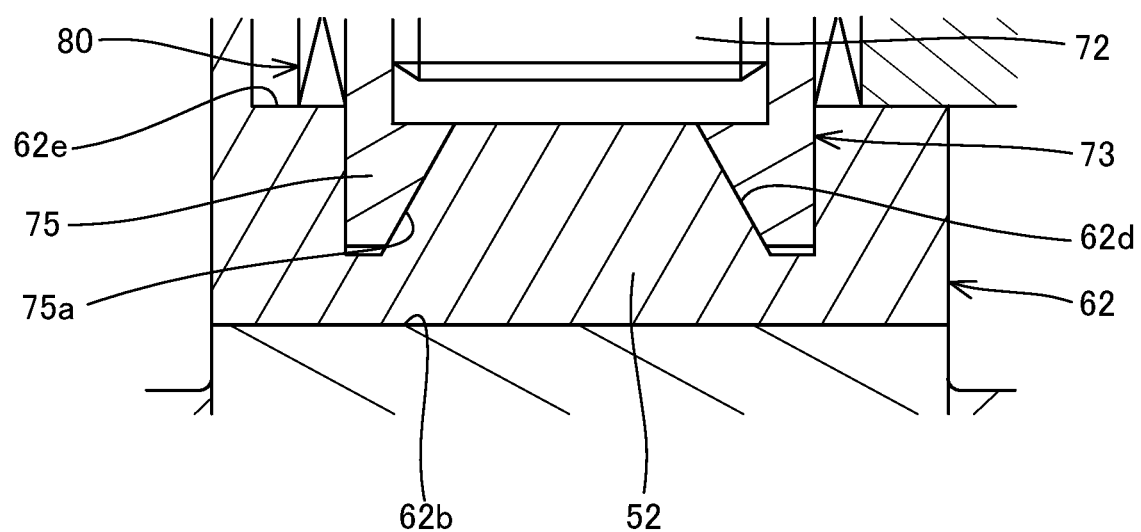
FIG. 5 is a cross-sectional view of an exemplary modification of the brake device according to the embodiment of the present invention, presenting an enlarged illustration of a pressing end portion.
Figure 6:
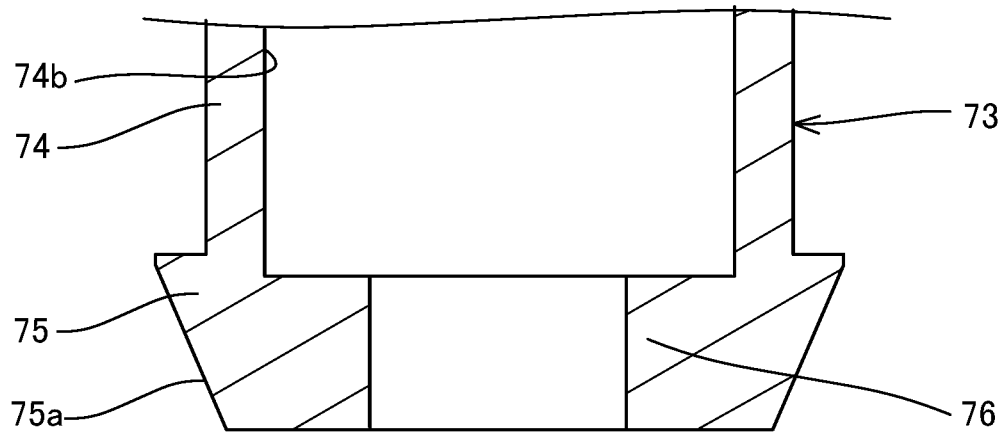
FIG. 6 is a cross-sectional view of a first exemplary modification of an extension nut and a reinforcement portion of the brake device according to the embodiment of the present invention.
Figure 7:
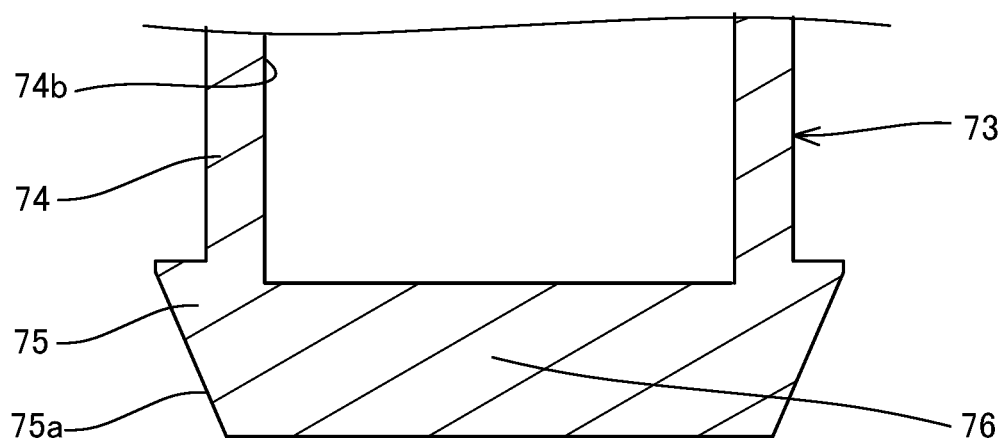
FIG. 7 is a cross-sectional view of a second exemplary modification of the extension nut and the reinforcement portion of the brake device according to the embodiment of the present invention.

Exemplary modifications of the above-described embodiment will now be described with reference to FIGS. 5 to 7.

In the above-described embodiment, the pressing surface 75a of the pressing end portion 75 of the extension nut 73, as well as the contact surface 62d of the main body recess portion 62a of the coupling base portion 62, are formed in a tapered shape so as to decrease in diameter toward the bottom portion of the main body recess portion 62a. Alternatively, as shown in FIG. 5, the pressing surface 75a and the contact surface 62d may be formed in a tapered shape so as to increase in diameter toward the bottom portion of the main body recess portion 62a. In this case, a part of the bottom portion of the main body recess portion 62a is inserted into the inner side of the pressing end portion 75 of the extension nut 73. This can reliably provide strength to the pressing end portion 75 without the presence of the reinforcement portion 76.

The pressing surface 75a and the contact surface 62d may not be formed in a tapered shape. For example, the pressing surface 75a and the contact surface 62d may be curved surfaces, or may be flat surfaces that are perpendicular to a central axis of the extension nut 73 (the main body recess portion 62a). In other words, the pressing surface 75a and the contact surface 62d may have any shape that achieves a desired detent force.

In the above-described embodiment, the reinforcement portion 76 is a solid support member that is press-fitted in the pressing end portion 75. However, the reinforcement portion 76 may be configured in any manner as long as it reinforces the pressing end portion 75. For example, the reinforcement portion 76 may be a hollow (tubular) member that is press-fitted in the pressing end portion 75.

The reinforcement portion 76 is not limited to being formed separately from the pressing end portion 75 and provided at the inner side of the pressing end portion 75. Alternatively, the reinforcement portion 76 may be formed integrally with the pressing end portion 75. For example, as shown in FIG. 6, the reinforcement portion 76 may be a thick wall portion that extends radially inward from an inner circumference of the pressing end portion 75. Alternatively, as shown in FIG. 7, the reinforcement portion 76 may be a bottom portion of the extension nut 73 that is formed into a shape of a tube with a bottom. In other words, it is sufficient for the reinforcement portion 76 to close at least a part of an opening of the bolt insertion hole 74b, through which the extension shaft 72 is inserted, near the pressing end portion 75.

In the above-described embodiment, whereas the extension shaft 72 is not rotatable, the extension nut 73 is rotatable, and the extension mechanism extends as a rotation torque is transmitted to the extension nut 73. Alternatively, the extension shaft 72 may be rotatable, and the extension nut 73 may not be rotatable.

The above-described embodiment achieves the following advantageous effects.

In the brake device 100, the pressing spring 92 presses the pressing surface 75a of the extension nut 73 against the contact surface 62d of the main body recess portion 62a of the coupling base portion 62, thereby increasing the frictional force between the pressing surface 75a of the extension nut 73 and the contact surface 62d of the main body recess portion 62a. The frictional force thus prevents involuntary rotation of the extension nut 73 caused by, for example, vibration of the vehicle. As such, the brake device 100 can prevent involuntary actuation of the adjuster 70 with use of a simple structure.

The pressing surface 75a and the contact surface 62d are in contact with each other as they are formed in a tapered shape corresponding to each other. Therefore, compared with a case in which they are formed as flat surfaces perpendicular to the central axis, the area of contact therebetween increases, and the frictional force further increases due to the wedge effect. As a result, involuntary rotation of the extension nut 73 relative to the extension shaft 72 can be prevented in a more effective manner.

In the extension nut 73, the maximum outer diameter of the pressing end portion 75 is larger than the maximum outer diameter of the main body portion. Thus, the area of contact between the pressing surface 75a and the contact surface 62d is increased, and the frictional force therebetween can be further increased.

The presence of the reinforcement portion 76 at the inner circumference of the pressing end portion 75 can reliably provide strength to the pressing end portion 75.

As the pressing spring 92 is seated on the seat portion 63e of the guide sleeve 63, it does not change in length even when the coupling member 60 extends. Therefore, the pushing force of the pressing spring 92 can be kept constant.

Below is a comprehensive description of the configurations, functions, and advantageous effects of the embodiment of the present invention.

The brake device 100 brakes the wheel 1 by pinching the brake discs 1a that rotate together with the wheel 1. The brake device 100 includes: the brake main body 10 supported by the vehicle body; the pair of link arms 30 having the support portions 32 between the one end portions 31 and the other end portions 33 thereof, the support portions 32 being pivotably supported by the brake main body 10; the actuator 20 actuated by supply and discharge of compressed air, and configured to press the brake linings 2 against the brake discs 1a by causing the pair of link arms 30 to pivot, the brake linings 2 being supported by the other end portions 33 of the pair of link arms 30 so as to face the opposite surfaces of the brake discs 1a, and being capable of imparting frictional forces by coming into sliding contact with the brake discs 1a; the coupling member 60 configured to couple the one end portions 31 of the pair of link arms 30 to each other, the coupling member 60 being extendable and contractable; and the adjuster 70 configured to cause the coupling member 60 to extend so that the positions of the brake linings 2 relative to the brake discs 1a are adjusted to be constant. The adjuster 70 includes: the extension mechanism 71 having the non-rotatable first member (extension shaft 72) and the rotatable second member (extension nut 73), and configured to cause the coupling member 60 to extend along with the rotation of the second member (extension nut 73) relative to the first member (extension shaft 72), the first member (extension shaft 72) being provided with the first screw portion (male thread 72a), the second member (extension nut 73) being provided with the second screw portion (female thread 74a) configured to be threadedly engaged with the first screw portion (male thread 72a); the one-way clutch 80 mounted on the outer circumference of the second member (extension nut 73), and capable of transmitting a rotation torque to the second member (extension nut 73) only in the extending direction of the coupling member 60; the contact portion (contact surface 62d) provided in the main body recess portion 62a and being in contact with one end portion of the second member (extension nut 73), the main body recess portion 62a being provided in the coupling member 60 and housing the second member (extension nut 73); and the pressing member (pressing spring 92) configured to press the second member (extension nut 73) in the axial direction toward the contact portion (contact surface 62d).

With this configuration, the pressing portion (pressing spring 92) presses the second member (extension nut 73) against the contact portion (contact surface 62d), thereby increasing the frictional force between the second member (extension nut 73) and the contact portion (contact surface 62d). Accordingly, the frictional force prevents the rotation of the second member (extension nut 73) caused by, for example, vibration of the vehicle. A simple structure composed of the pressing portion (pressing spring 92) and the contact portion (contact surface 62d) arrests the rotation of the adjuster 70. Therefore, with such a simple structure, the brake device 100 can prevent involuntary actuation of the adjuster 70.

Furthermore, in the brake device 100, the contact portion is the tapered contact surface 62d inclining with respect to the central axis of the second member (extension nut 73), and the second member (extension nut 73) includes: the main body portion 74 provided with the second screw portion (female thread 74a); and the pressing end portion 75 that is formed in a shape corresponding to the contact surface 62d and having the pressing surface 75a that is in contact with the contact surface 62d.

Furthermore, in the brake device 100, the maximum outer diameter of the pressing end portion 75 is larger than the maximum outer diameter of the main body portion.

With these configurations, the pressing surface 75a and the contact surface 62d are tapered surfaces that are in contact with each other. This increases the area of contact therebetween, thereby increasing the frictional force. Therefore, involuntary actuation of the adjuster 70 can be prevented in a more reliable manner.

Furthermore, in the brake device 100, the first member (extension shaft 72) is a bolt member having an outer circumference provided with the first screw portion, and the first screw portion is the male thread 72a. The second member (extension nut 73) is a nut member having the bolt insertion hole 74b through which the first member (extension shaft 72) is inserted, and the second screw portion is the female thread 74a provided on the inner circumference of the bolt insertion hole 74b. The reinforcement portion 76 configured to reinforce the pressing end portion 75 of the second member (extension nut 73) is provided at the inner side of the pressing end portion 75.

Furthermore, in the brake device, the reinforcement portion 76 is a solid support member that is press-fitted on the inner circumference of the pressing end portion 75.

With these configurations, even though the tapered pressing surface 75a is formed, the durability of the second member (extension nut 73) can be improved because the reinforcement portion 76 reliably provides strength to the pressing end portion 75.

Furthermore, in the brake device 100, the coupling member 60 includes: the coupling main body portion 61 coupled to one of the link arms 30 and provided with the main body recess portion 62a; the coupling rod portion 65 coupled to the other of the link arms 30; and the guide sleeve 63 coupled to the coupling main body portion 61, and configured to move, together with the coupling main body portion 61, in the axial direction relative to the coupling rod portion 65. The pressing member is the pressing spring 92 interposed between the seat portion 63e, which is provided in the guide sleeve 63, and the second member (extension nut 73).

With this configuration, the pressing spring 92 is seated on the seat portion 63e provided in the guide sleeve 63. Thus, the pressing spring 92 does not change in length and its pushing force can be kept constant even when the coupling member 60 extends.

The embodiments of the present invention described above are merely illustration of some application examples of the present invention and not of the nature to limit the technical scope of the present invention to the specific constructions of the above embodiments.

The present application claims a priority based on Japanese Patent Application No. 2015-187707 filed with the Japan Patent Office on Sep. 25, 2015, all the contents of which are hereby incorporated by reference.

The invention claimed is:

1. A brake device for braking a wheel by pinching brake discs rotatable together with the wheel, the brake device comprising:
   a brake main body supported by a vehicle body or a truck;
   a pair of link arms each having a first end portion, a second end portion and a support portion between the first end portion and the second end portion, the support portion being pivotably supported by the brake main body;
   an actuator actuated by supply and discharge of a working fluid, the actuator being configured to press brake linings against the brake discs by causing the pair of link arms to pivot, the brake linings being supported by the second end portions of the pair of link arms so as to face opposite surfaces of the brake discs, the brake linings being configured to impart frictional forces by coming into sliding contact with the brake discs;
   a coupling member coupling the first end portions of the pair of link arms to each other, the coupling member being extendable and contractable; and
   an adjuster configured to cause the coupling member to extend so that positions of the brake linings relative to the brake discs are adjusted to be constant, wherein the adjuster includes:
   an extension mechanism having a non-rotatable first member and a rotatable second member, the extension mechanism being configured to cause the coupling member to extend along with rotation of the second member relative to the first member, the first member being provided with a first screw portion, the second member being provided with a second screw portion threadedly engaged with the first screw portion;

a torque transmission portion mounted on an outer circumference of the second member, the torque transmission portion being configured to transmit a rotation torque to the second member only in the extending direction of the coupling member;

a contact portion provided in a housing portion formed in the coupling member so as to house the second member, the contact portion being in contact with one end portion of the second member; and a pressing member configured to press the second member in an axial direction toward the contact portion.

2. The brake device according to claim 1, wherein
the contact portion is a tapered contact surface inclining with respect to a central axis of the second member, and
the second member includes:
　a main body portion provided with the second screw portion; and
　a pressing end portion formed in a shape corresponding to the contact surface, the pressing end portion being provided with a pressing surface being in contact with the contact surface.

3. The brake device according to claim 2, wherein
a maximum outer diameter of the pressing end portion is larger than a maximum outer diameter of the main body portion.

4. The brake device according to claim 2, wherein
the first member is a bolt member having an outer circumference provided with the first screw portion, and the first screw portion is a male thread,
the second member is a nut member having a bolt insertion hole, the first member is inserted through the bolt insertion hole, and the second screw portion is a female thread provided on an inner circumference of the bolt insertion hole, and
a reinforcement portion configured to reinforce the pressing end portion of the second member is provided at an inner side of the pressing end portion.

5. The brake device according to claim 4, wherein
the reinforcement portion is a solid support member press-fitted on an inner circumference of the pressing end portion.

6. The brake device according to claim 1, wherein
the coupling member includes:
　a coupling main body portion coupled to one of the link arms, the coupling main body being provided with the housing portion;
　a coupling rod portion coupled to the other of the link arms; and
　a guide sleeve coupled to the coupling main body portion so as to move together with the coupling main body portion, the guide sleeve being configured to move relative to the coupling rod portion in the axial direction, and
the pressing member is a pressing spring interposed between a seat portion and the second member, the seat portion being provided in the guide sleeve.

* * * * *